(12) United States Patent
Hayashi

(10) Patent No.: US 11,385,841 B2
(45) Date of Patent: Jul. 12, 2022

(54) PRINTER AND NON-TRANSITORY COMPUTER-READABLE RECORDING MEDIUM STORING COMPUTER-READABLE INSTRUCTIONS FOR PRINTER FOR DELETING PRINT SETTING INFORMATION STORED IN PRINTER

(71) Applicant: BROTHER KOGYO KABUSHIKI KAISHA, Nagoya (JP)

(72) Inventor: Hiroyuki Hayashi, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/165,193

(22) Filed: Feb. 2, 2021

(65) Prior Publication Data

US 2021/0240404 A1 Aug. 5, 2021

(30) Foreign Application Priority Data

Feb. 5, 2020 (JP) .............................. JP2020-018299

(51) Int. Cl.
*G06F 3/12* (2006.01)

(52) U.S. Cl.
CPC .......... *G06F 3/1205* (2013.01); *G06F 3/1232* (2013.01); *G06F 3/1238* (2013.01)

(58) Field of Classification Search
None
See application file for complete search history.

(56) References Cited

U.S. PATENT DOCUMENTS

| 2014/0247464 | A1  | 9/2014  | Sugimoto et al. |
|---|---|---|---|
| 2017/0199710 | A1* | 7/2017  | Ando ................... G06F 3/1274 |
| 2020/0125301 | A1  | 4/2020  | Kaneda |
| 2020/0319830 | A1  | 10/2020 | Kaneda et al. |

FOREIGN PATENT DOCUMENTS

| JP | 07141134 A   | * | 6/1995  |
|----|--------------|---|---------|
| JP | 2015-201053 A|   | 11/2015 |
| JP | 2019-006099 A|   | 1/2019  |
| JP | 2019-119089 A|   | 7/2019  |

OTHER PUBLICATIONS

English translation of Japanese Patent Application 05-290442 (corresponding to Japanese Publication 07-141134). (Year: 1993).*
Extended European Search Report dated Jul. 5, 2021 from related EP21155113.0.

* cited by examiner

*Primary Examiner* — Thomas D Lee

(74) *Attorney, Agent, or Firm* — Scully, Scott, Murphy & Presser, PC

(57) ABSTRACT

A printer may receive first user identification information among one or more user identification information from a first external device via a communication interface of the printer, and receive a first deletion request including first specific information from the first external device via the communication interface. In a case where the first user identification information and the first deletion request are received from the first external device and the first user identification information is stored in a memory of the printer in association with the first print setting information, the printer may delete the first print setting information identified by the first specific information from the memory.

14 Claims, 14 Drawing Sheets

FIG. 2

| User Name | Password | Authority | Registered Preset Name | | | Excluded Preset Name | | |
|---|---|---|---|---|---|---|---|---|
| U1 | P1 | Owner | DPR | — | — | — | — | — |
| U2 | P2 | Guest | DPR | GPR1 | IPR1 | — | — | — |
| U3 | P3 | Guest | DPR | GPR1 | IPR2 | — | — | — |
| ... | ... | ... | ... | | | ... | | |

38

| Preset Name | Print Setting Information | |
|---|---|---|
| | Print Type | Number of Colors |
| DPR | One-sided | Monochrome |
| GPR1 | One-sided | Color |
| IPR1 | Two-sided | Monochrome |
| IPR2 | Two-sided | Color |
| ... | ... | ... |

40

← PI1
← PI2
← PI3
← PI4

(Case B)

(Case F)

PRINTER AND NON-TRANSITORY COMPUTER-READABLE RECORDING MEDIUM STORING COMPUTER-READABLE INSTRUCTIONS FOR PRINTER FOR DELETING PRINT SETTING INFORMATION STORED IN PRINTER

CROSS-REFERENCE TO RELATED APPLICATION

This application claims priority to Japanese Patent Application No. 2020-018299, filed on Feb. 5, 2020, the entire contents of which are hereby incorporated by reference into the present application.

TECHNICAL FIELD

The disclosure herein discloses art for deleting print setting information stored in a printer.

BACKGROUND ART

An image forming system provided with a communication device and a multi-function peripheral (MFP) is known. A print preset according to Internet Printing Protocol (IPP) is registered in the MFP. An administrator can delete the print preset from the MFP.

SUMMARY

In the image forming system, no consideration is given to a user, who is not the administrator, deleting the print preset registered in the MFP. The disclosure herein provides a printer configured to delete print setting information according to a request of a user different from an administrator.

A printer disclosed herein may comprise: a memory configured to store, for each of one or more user identification information for identifying one or more users different from an administrator of the printer, the user identification information and print setting information in association with each other; a communication interface; and a controller configured to: receive first user identification information among the one or more user identification information from a first external device via the communication interface; receive a first deletion request including first specific information from the first external device via the communication interface, the first deletion request being for requesting deletion of one of the one or more print setting information in the memory, the first specific information being for identifying first print setting information among the one or more print setting information in the memory; and in a case where the first user identification information and the first deletion request are received from the first external device and the first user identification information is stored in the memory in association with the first print setting information, delete the first print setting information identified by the first specific information from the memory.

A control method, a computer program, and a computer-readable recording medium storing the computer program for realizing the printer as above are also novel and useful. Further, a communication system comprising the printer and the first external device as above is also novel and useful.

BRIEF DESCRIPTION OF THE DRAWINGS

FIG. 2 show respective tables.

EMBODIMENTS (Configuration of Communication System 2; FIG. 1)

As shown in FIG. 1, a communication system 2 is provided with a printer 10 and a plurality of PCs 100A to 100C. The printer 10 and the PCs 100A to 100C belong to the same Local Area Network (LAN) 4 and are configured to communicate with each other via the LAN 4.

(Configuration of Printer 10)

Figure 1:
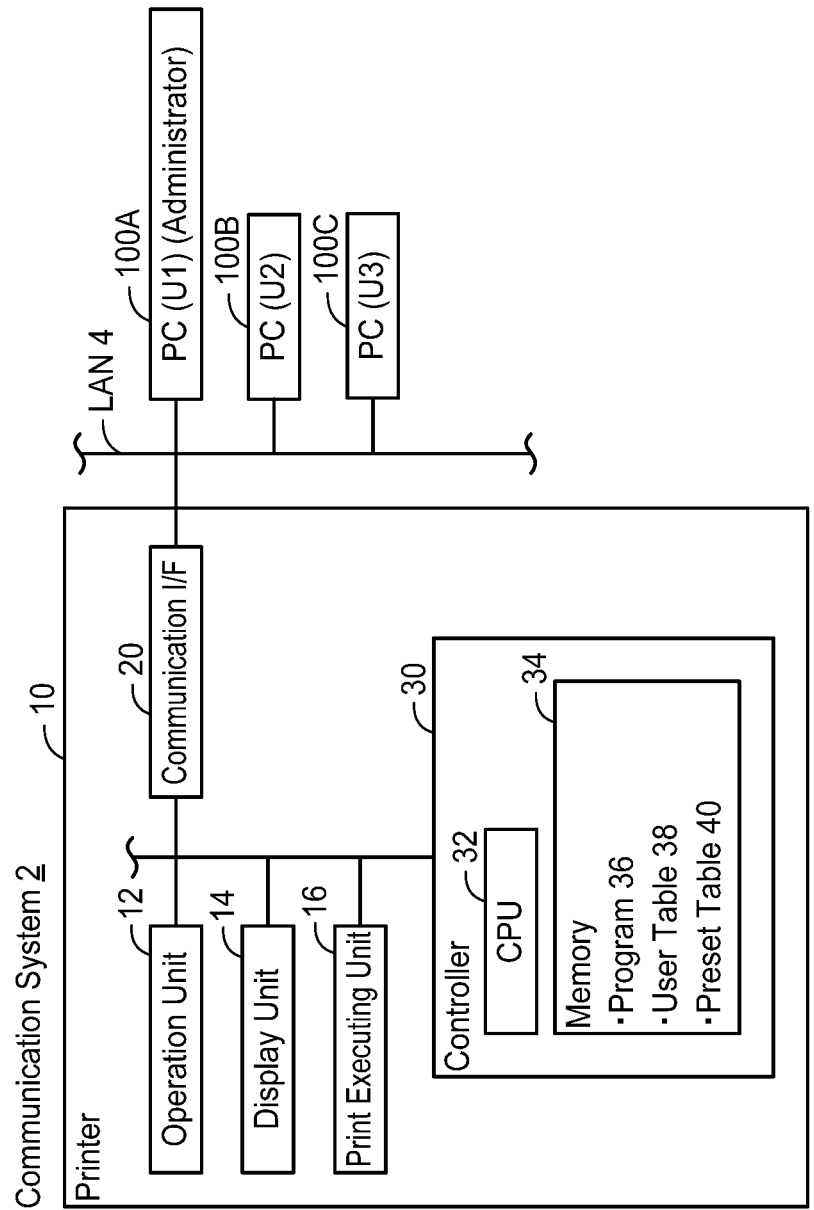
FIG. 1 shows a configuration of a communication system.

The printer 10 is a peripheral device (i.e., a peripheral device of the PCs 100A to 100C) configured to execute a print function. The printer 10 is further configured to execute a web server function. The web server function is a function of sending webpage data representing a webpage to an external device in response to the external device accessing a web server in the printer 10. The printer 10 may be a multi-function peripheral configured to execute, in addition to the above functions, a scan function, a FAX function, and/or the like. The printer 10 is provided with an operation unit 12, a display unit 14, a print executing unit 16, a communication interface (hereinbelow, an interface will be denoted "I/F") 20, and a controller 30.

The operation unit 12 is provided with a plurality of keys. A user can input various instructions to the printer 10 by operating the operation unit 12. The display unit 14 is a display for displaying various types of information. The display unit 14 also functions as a so-called touch screen (i.e., an operation unit). The print executing unit 16 is a print mechanism of an inkjet scheme, a laser scheme, or the like. The communication I/F 20 is connected to the LAN 4. The communication I/F 20 may be a wireless I/F or a wired I/F.

The controller 30 is provided with a CPU 32 and a memory 34. The CPU 32 is configured to execute various processes according to a program 36 stored in the memory 34. The memory 34 is configured of a volatile memory, a nonvolatile memory, and the like. The memory 34 stores a user table 38 and a preset table 40.

(Configurations of PCs 100A to 100C)

The PC 100A is used by an administrator of the printer 10. The PCs 100B, 100C are used by users that are different from the administrator of the printer 10. The PCs 100A, 100B, and 100C respectively store user names "U1", "U2", and "U3" for identifying the users using the respective PCs.

Each of the PCs 100A to 100C is provided with an Internet Printing Protocol (IPP) program (not shown) installed from a server on the Internet. Each IPP program is a program for creating an IPP command according to Hyper Text Transfer Protocol (HTTP) and sending the command to the printer 10. In the present embodiment, the aforementioned server is provided by a business entity different from a vendor of the printer 10. However, in a variant, the aforementioned server may be provided by the vendor of the printer 10. Each of the PCs 100A to 100C may originally support IPP without installing the IPP program from the server.

(Contents of Tables 38, 40; FIG. 2)

Next, contents of the user table 38 and the preset table 40 in the printer 10 will be described with reference to FIG. 2.

In the user table 38, for each of one or more users who use the printer 10, a user name, a password, authority information, a registered preset name, and an excluded preset name are stored in association with each other. The user name, the password, and the authority information are registered by the administrator of the printer 10. The user name and the password are information used for authentication of each user. The authority information indicates one of "Owner" and "Guest". "Owner" is information indicating the administrator of the printer 10, and "Guest" is information indicating a user different from the administrator of the printer 10, that is, a general user (in other words, individual user). The registered preset name and the excluded preset name are information for identifying preset information to be described later. The registered preset name is a name of preset information that can be used in printing. The excluded preset name is a name of preset information that cannot be used in printing.

In the preset table 40, one or more preset information are stored. Each preset information includes a preset name and print setting information. The print setting information includes a print condition corresponding to a print setting item "print type" (i.e., "one-sided" or "two-sided") and another print condition corresponding to a print setting item "number of colors" (i.e., "monochrome" or "color"). In a variant, the print setting information may include other print setting item(s) (e.g., image quality, paper size, paper type, number of print copies, and/or postprocess). Further, the print setting information may not include one of the print setting item "print type" and the print setting item "number of colors". Preset information PI1 including a preset name "DPR" is default preset information stored in the preset table 40 in advance. The default preset information can be used by all users, and is undeletable. In a variant, the default preset information may be deletable. For example, the administrator of the printer 10 may be permitted to delete the default preset information. Hereinbelow, preset information including a preset name (e.g., "IPR1" or "IPR2") that is associated with only one user name in the user table 38 may be termed "individual preset information", while preset information including a preset name (e.g., "GPR1") that is associated with two or more user names in the user table 38 may be termed "group preset information".

Figure 3:
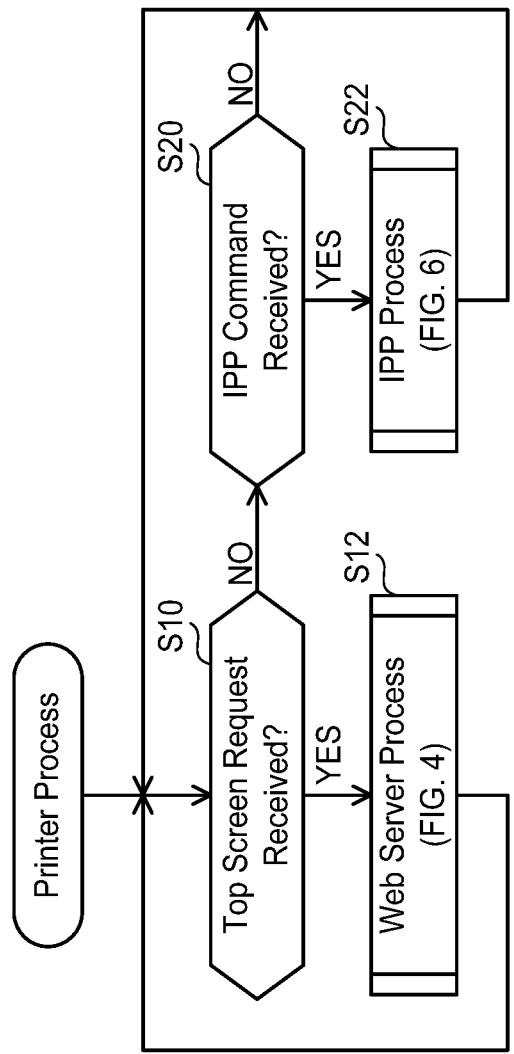
FIG. 3 shows a flowchart of a printer process.

(Printer Process; FIG. 3)

Next, a printer process executed by the CPU 32 of the printer 10 will be described with reference to FIG. 3. The process of FIG. 3 is started when power of the printer 10 is turned on. All of below-described communication executed by the printer 10 are executed via the communication I/F 20. As such, the phrase "via the communication I/F 20" will be omitted hereinbelow.

In S10, the CPU 32 monitors receipt of a top screen request from a PC. The top screen request is a command for requesting sending of top screen data for displaying a top screen, and is a GET command according to HTTP. The CPU 32 proceeds to S12 in a case of receiving the top screen request from a PC (YES in S10).

Figure 4:
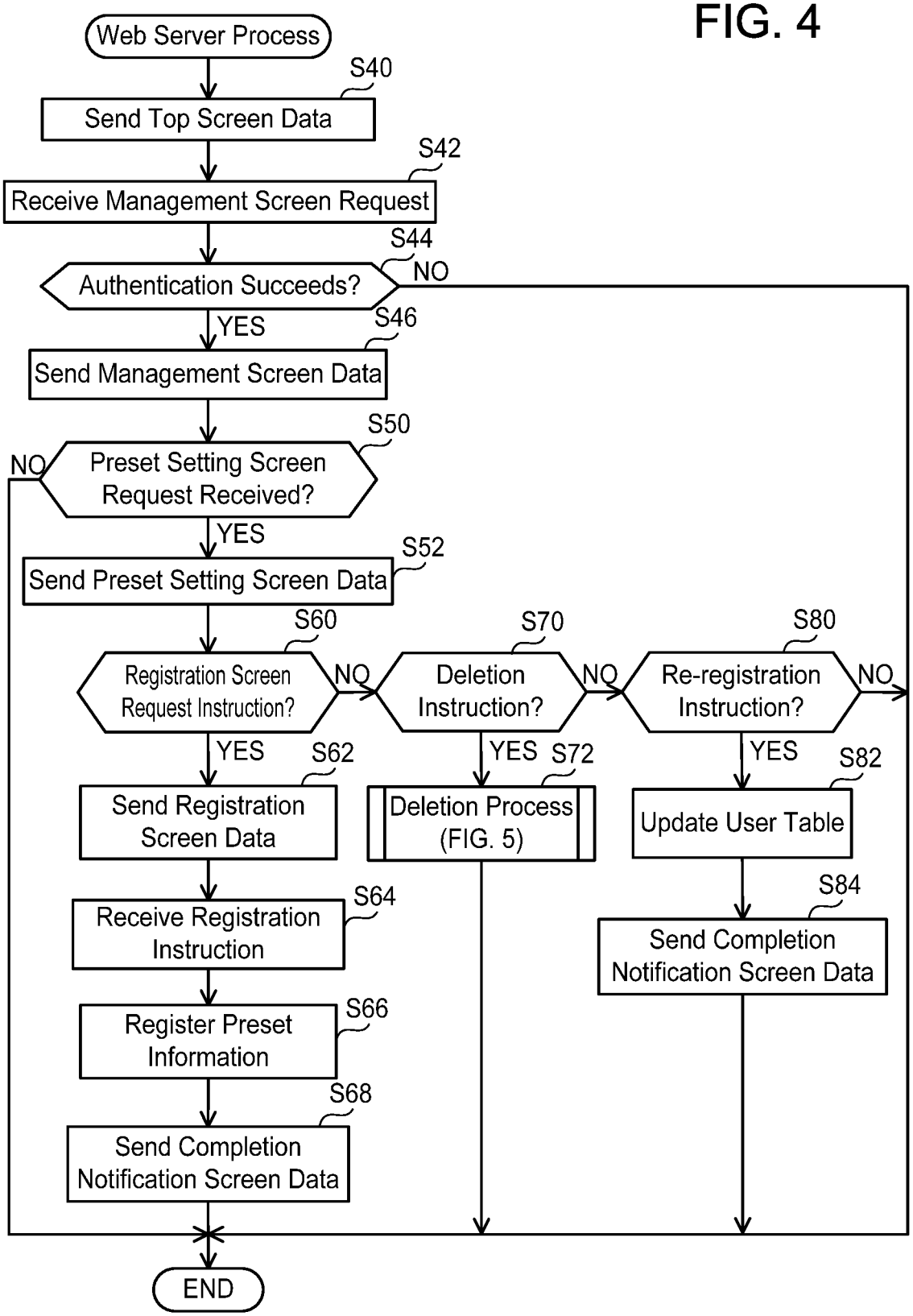
FIG. 4 shows a flowchart of a web server process.

In S12, the CPU 32 executes a web server process (FIG. 4). The web server process is a process for the printer 10 to function as a web server. When S12 is completed, the CPU 32 returns to S10.

At the same time as the monitoring of S10, the CPU 32 monitors receipt of an IPP command from a PC in S20. The CPU 32 proceeds to S22 in a case of receiving an IPP command from a PC (YES in S20).

Figure 6:
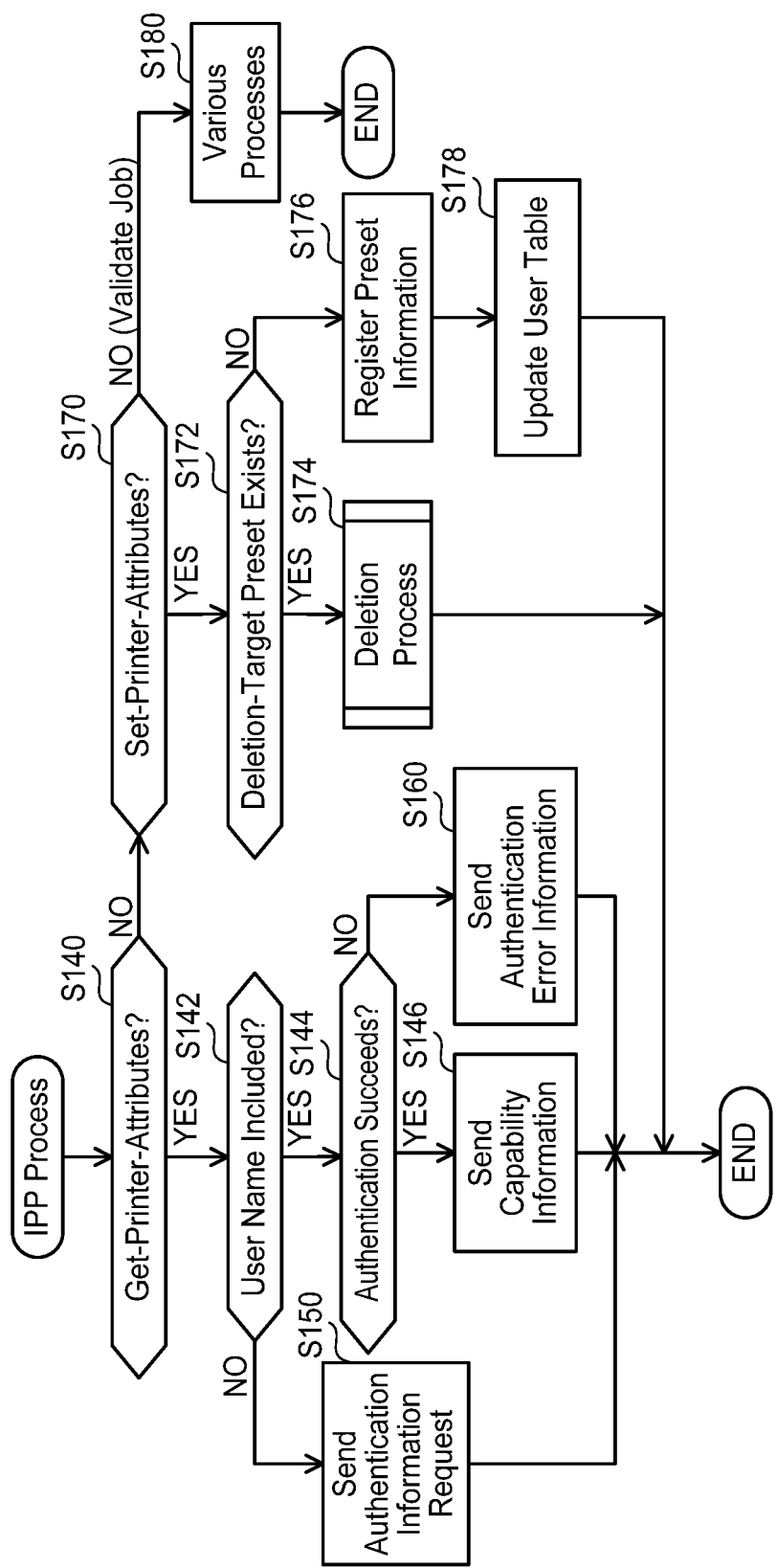
FIG. 6 shows a flowchart of an IPP process.

In S22, the CPU 32 executes an IPP process (FIG. 6). The IPP process is a process for executing communication according to IPP to register or delete preset information into/from the preset table 40. When S22 is completed, the CPU 32 returns to S10.

(Web Server Process; FIG. 4)

Next, the web server process executed in S12 of FIG. 3 will be described with reference to FIG. 4. In S40, the CPU 32 sends the top screen data for displaying the top screen to the PC. The top screen is a screen for allowing a user to input a user name and a password.

In S42, the CPU 32 receives a management screen request including a user name and a password from the PC. The management screen request is a GET command according to HTTP and is sent from the PC in response to a user name and a password being inputted to the top screen.

In S44, the CPU 32 executes user authentication using the user name and the password in the management screen request. The CPU 32 determines YES in S44 and proceeds to S46 in a case where the combination of the user name and the password in the management screen request is stored in the user table 38, that is, in a case where the user authentication succeeds. Hereinbelow, the user name for which the user authentication succeeded will be termed "authenticated user name" On the other hand, the CPU 32 determines NO in S44 and terminates the process of FIG. 4 in a case where the combination of the user name and the password in the management screen request is not stored in the user table 38, that is, in a case where the user authentication fails.

Figure 14:
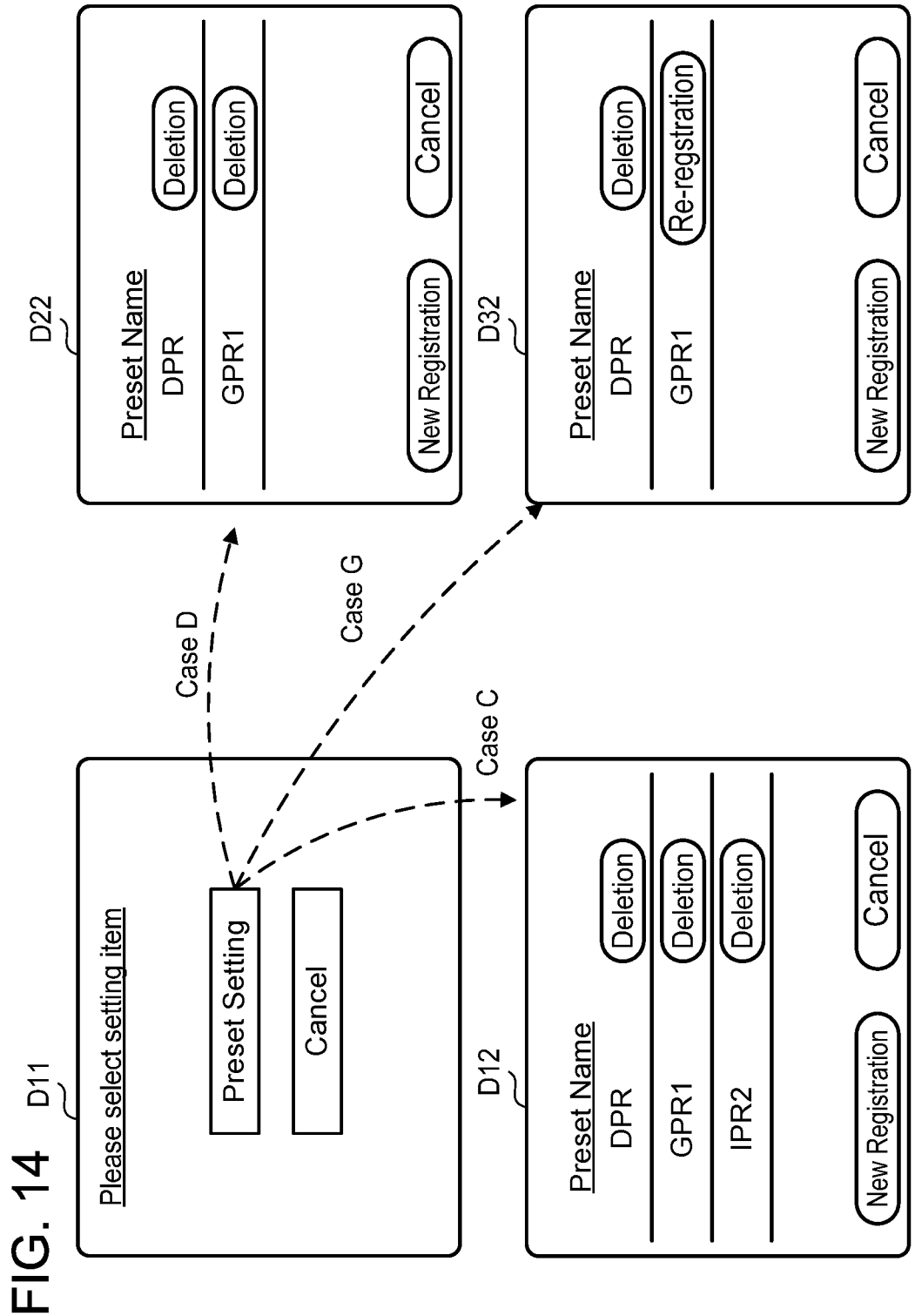
FIG. 14 shows examples of a screen displayed on a PC.

In S46, the CPU 32 sends management screen data for displaying a management screen D11 to the PC. As shown in FIG. 14, the screen D11 includes a preset setting button and a cancel button.

In S50, the CPU 32 monitors receipt of a preset setting screen request from the PC. The preset setting screen request is a GET command according to HTTP and is sent from the PC in response to the preset setting button in the management screen D11 being selected. The CPU 32 proceeds to S52 in a case where the preset setting screen request is received from the PC (YES in S50). On the other hand, the CPU 32 terminates the process of FIG. 4 in a case where a cancel request is received from the PC (NO in S50). The cancel request is sent from the PC in response to the cancel button in the management screen D11 being selected.

In S52, the CPU 32 sends preset setting screen data for displaying a preset setting screen D12 (or D22 or D32) to the PC. As shown in FIG. 14, the screen D12 (or D22 or D32) includes one or more preset names stored in the preset table 40, a new registration button, and a cancel button. A deletion button or a re-registration button is associated with each of the one or more preset names. The deletion button is a button corresponding to a registered preset name associated with the authenticated user name in the user table 38, and is a button for deleting preset information including that preset name. The re-registration button is a button corresponding to an excluded preset name associated with the authenticated user name in the user table 38, and is a button for re-registering that preset name as a registered preset name.

In each of S60, S70, and S80, the CPU 32 monitors receipt of an instruction from the PC. The CPU 32 determines YES in S60 and proceeds to S62 in a case of receiving a registration screen request instruction from the PC. The registration screen request instruction is a GET command according to HTTP and is sent from the PC in response to the new registration button in the preset setting screen being selected.

In S62, the CPU 32 sends registration screen data for displaying a registration screen to the PC. The registration screen is a screen for input of a preset name and a registration-target user name to be registered and also for setting of print setting information. The registration-target user name may be the same as the authenticated user name or a different user name. Further, the registration-target user name may be two or more user names.

In S64, the CPU 32 receives a registration instruction including preset information and a registration-target user name from the PC. The registration instruction is a POST command according to HTTP.

In S66, the CPU 32 registers the preset information (i.e., the preset name and the print setting information) included in the registration instruction received in S64 to the preset table 40. Further, the CPU 32 registers the preset name of the preset information to the user table 38 as a registered preset name corresponding to the registration-target user name.

In S68, the CPU 32 sends to the PC completion notification screen data for displaying a completion notification screen including a message that the registration of the preset information has been completed. When S68 is completed, the CPU 32 terminates the process of FIG. 4.

In a case of receiving a deletion instruction including a preset name from the PC, the CPU 32 determines YES in S70 and proceeds to S72. The deletion instruction is a POST command according to HTTP and is sent from the PC in response to the deletion button in the preset setting screen (see the screens D12, D22, D32 of FIG. 14) being selected.

In S72, the CPU 32 executes a deletion process. The deletion process is a process for deleting the preset information included in the deletion instruction from the preset table 40. When S72 is completed, the CPU 32 terminates the process of FIG. 4.

In a case of receiving a re-registration instruction including a preset name from the PC, the CPU 32 determines YES in S80 and proceeds to S82. The re-registration instruction is a POST command according to HTTP and is sent from the PC in response to the re-registration button in the preset setting screen (see the screen D32 of FIG. 14) being selected.

In S82, the CPU 32 registers the preset name included in the registration instruction as a registered preset name instead of as an excluded preset name for the information associated with the authenticated user name in the user table 38.

In S84, the CPU 32 sends to the PC completion notification screen data for displaying a completion notification screen including a message that the re-registration of the preset information has been completed. When S84 is completed, the CPU 32 terminates the process of FIG. 4.

Figure 5:
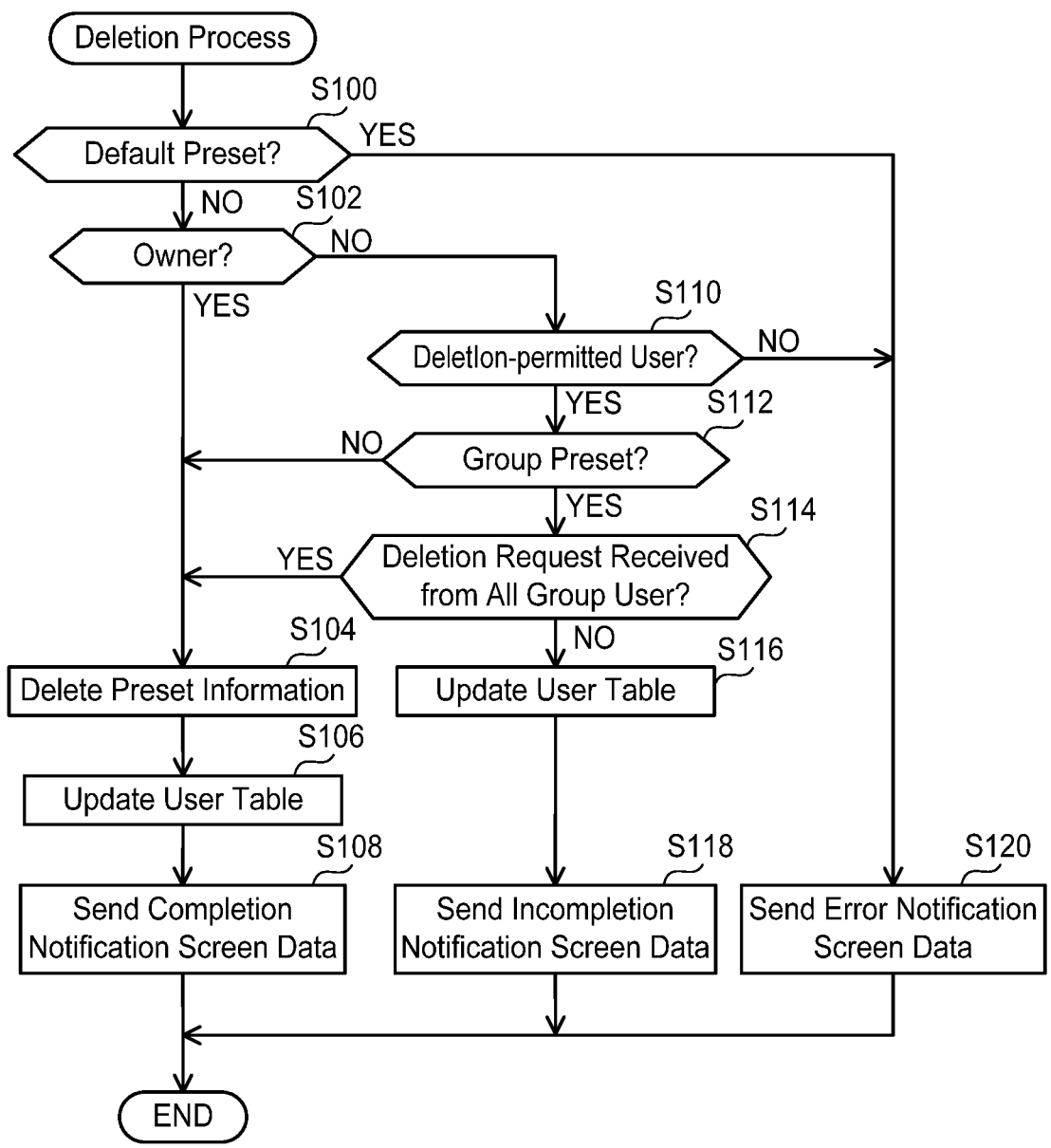
FIG. 5 shows a flowchart of a deletion process.

(Deletion Process; FIG. 5)

Next, the deletion process executed in S72 of FIG. 4 will be described with reference to FIG. 5. In S100, the CPU 32 determines whether or not the preset information including the preset name in the deletion instruction received in S70 (hereinbelow, this preset information may be termed "dele-tion-target preset information") is the default preset information. The CPU 32 proceeds to S120 in a case where the deletion-target preset information is the default preset information (YES in S100). On the other hand, the CPU 32 proceeds to S102 in a case where the deletion-target preset information is not the default preset information (NO in S100).

In S102, the CPU 32 determines whether or not the authority information associated with the authenticated user name in the user table 38 is "Owner". In a case where the authority information associated with the authenticated user name is "Owner" (YES in S102), the CPU 32 proceeds to S104. On the other hand, in a case where the authority information associated with the authenticated user name is "Guest" (NO in S102), the CPU 32 proceeds to S110.

In S104, the CPU 32 deletes the deletion-target preset information (i.e., the preset name and the print setting information) from the preset table 40.

In S106, the CPU 32 deletes the preset name of the deletion-target preset information (hereinbelow, this preset name may be termed "deletion-target preset name") from the user table 38.

In S108, the CPU 32 sends to the PC completion notification screen data for displaying a completion notification screen including a message that the deletion of the preset information has been completed. When S108 is completed, the CPU 32 terminates the process of FIG. 5.

In S110, the CPU 32 determines whether or not the user having the authenticated user name is a user who is permitted for deletion (which may be termed "deletion-permitted user" hereinbelow). Specifically, the CPU 32 determines that the user having the authenticated user name is a deletion-permitted user in a case where the deletion-target preset name is registered as a registered preset name associated with the authenticated user name in the user table 38. On the other hand, the CPU 32 determines that the user having the authenticated user name is not a deletion-permitted user in a case where the deletion-target preset name is registered as a registered preset name associated with a user name different from the authenticated user name. The CPU 32 proceeds to S112 in the case of determining that the user is a deletion-permitted user (YES in S110). On the other hand, the CPU 32 proceeds to S120 in the case of determining that the user is not a deletion-permitted user (NO in S110).

In S120, the CPU 32 sends to the PC error notification screen data for displaying an error notification screen including a message that the deletion of the preset information failed. When S120 is completed, the CPU 32 terminates the process of FIG. 5.

In S112, the CPU 32 determines whether or not the deletion-target preset information is group preset information. Specifically, the CPU 32 determines that the deletion-target preset information is group preset information in a case where the deletion-target preset name is stored as a registered preset name in association with two or more user names in the user table 38. On the other hand, the CPU 32 determines that the deletion-target preset information is not group preset information (i.e., that it is individual preset information) in a case where the deletion-target preset name is stored in association with only one user name. The CPU 32 proceeds to S114 in the case of determining that the deletion-target preset information is the group preset information (YES in S112). On the other hand, the CPU 32 proceeds to S104 in the case of determining that the deletion-target preset information is not the group preset information (NO in S112).

In S114, the CPU 32 determines whether or not the deletion instruction has been received from every user who can use the deletion-target preset information. Firstly, the CPU 32 identifies, in the user table 38, user names associated with the deletion-target preset name as the registered preset name, other than the authenticated user name. Then, the CPU 32 determines whether or not the deletion-target preset name is stored in the user table 38 as an excluded preset name associated with all the identified user names. The CPU 32 proceeds to S104 in a case where the deletion-target preset name is stored as an excluded preset name associated with all the identified user names (YES in S114). On the other hand, the CPU 32 proceeds to S116 in a case where the deletion-target preset name is stored as a registered preset name associated with at least one of the identified user names (NO in S114). In S106 that takes place after S104 continued from YES in S114, the CPU 32 deletes, from the user table 38, the deletion-target preset name stored as the registered preset name associated with the authenticated user name and also deletes the deletion-target preset name stored as the excluded preset name associated with the user names other than the authenticated user name.

In S116, the CPU 32 deletes the deletion-target preset name registered as an registered preset name associated with the authenticated user name from the user table 38 and registers the deletion-target preset name as an excluded preset name associated with the authenticated user name in the user table 38.

In S118, the CPU 32 sends to the PC incompletion notification screen data for displaying an incompletion notification screen including a message that the deletion of the preset information is incomplete. When S118 is completed, the CPU 32 terminates the process of FIG. 5.

(IPP Process; FIG. 6)

Next, the IPP process executed in S22 of FIG. 3 will be described with reference to FIG. 6. In S140, the CPU 32 determines whether or not the IPP command received in S20 of FIG. 3 is a Get-Printer-Attributes command (hereinbelow termed "GPA"). The GPA is a command that requests the printer 10 to send capability information. The CPU 32 proceeds to S142 in a case where the IPP command is a GPA (YES in S140). On the other hand, the CPU 32 proceeds to S170 in a case where the IPP command is not a GPA (NO in S140).

In S142, the CPU 32 determines whether or not a user name and a password are included in the GPA. The CPU 32 proceeds to S144 in a case where a user name and a password are included in the GPA (YES in S142). On the other hand, the CPU 32 proceeds to S150 in a case where a user name and a password are not included in the GPA (NO in S142). In S150, the CPU 32 sends to the PC an authentication information request for displaying an authentication screen on the PC. The authentication screen is a screen for allowing the user to input a user name and a password. When S150 is completed, the CPU 32 terminates the process of FIG. 6.

S144 is the same as S44 of FIG. 4 except that the user name and the password in the GPA are used. The CPU 32 proceeds to S146 in a case of determining YES in S144, while it proceeds to S160 in a case of determining NO in S144.

In S146, the CPU 32 sends capability information to the PC. Firstly, the printer 10 determines whether or not an excluded preset name is stored in the user table 38 in association with the user name in the GPA. In a case where an excluded preset name is not stored in association with the user name in the GPA, the CPU 32 identifies all the preset information stored in the preset table 40 as sending-target preset information to be sent. On the other hand, in a case where an excluded preset name is stored in association with the user name in the GPA, the CPU 32 identifies, from among all the preset information stored in the preset table 40, preset information that is other than the preset information including the excluded preset name as the sending-target preset information. Then, the CPU 32 sends to the PC capability information that includes all the print conditions which the printer 10 can use (i.e., "one-sided", "two-sided", "monochrome", and "color") and the identified sending-target preset information. In a variant, the printer 10 may send capability information including all the print conditions which the printer 10 can use, and may send the identified sending-target preset information separately from the capability information. When S146 is completed, the CPU 32 terminates the process of FIG. 6.

In S160, the CPU 32 sends to the PC authentication error information for displaying an error notification screen including a message that the user authentication failed on the PC. When S160 is completed, the CPU 32 terminates the process of FIG. 6.

In S170, the CPU 32 determines whether or not the IPP command received in S20 of FIG. 3 is a Set-Printer-Attributes command (hereinbelow termed "SPA"). The SPA is a command that requests the printer 10 to register or delete preset information. The SPA is sent from the PC after the capability information has been sent to the PC (S146) as a result of the user authentication having succeeded (YES in S144). The SPA includes the user name for which the authentication succeeded. The CPU 32 proceeds to S172 in a case where the IPP command is an SPA (YES in S170). On the other hand, the CPU 32 proceeds to S180 in a case where the IPP command is not an SPA (NO in S170). In the case where it is determined NO in S170, the IPP command is a Validate-Job command (hereinbelow termed "VJ") or the like.

In S172, the CPU 32 determines whether or not deletion-target preset information is designated by using the preset information in the SPA and the preset information stored in the preset table 40. Specifically, in a case where there is preset information that is in the preset table 40 but is not in the SPA, the CPU 32 identifies this preset information as deletion-target preset information, determines YES in S172, and proceeds to S174. On the other hand, in a case where there is preset information that is in the SPA but is not in the preset table 40, the CPU 32 identifies this preset information as registration-target preset information, determines NO in S172, and proceeds to S176.

In S174, the CPU 32 executes a deletion process. In this deletion process, processes same as S100 to S106 and S110 to S116 of FIG. 5 are executed except that the user name in the SPA and the deletion-target preset information identified in S172 are used. Further, in this deletion process, the CPU 32 sends, to the PC after S106, deletion completion information for displaying the completion notification screen on the PC. Further, the CPU 32 sends, to the PC after S116, incompletion information for display the incompletion notification screen on the PC. Further, after having determined NO in S100, the CPU 32 sends to the PC deletion error information for displaying an error notification screen including a message that the deletion of the preset information failed on the PC.

In S176, the CPU 32 registers the registration-target preset information in the SPA to the preset table 40.

In S178, the CPU 32 registers to the user table 38 the preset name of the identified registration-target preset information as a registered preset name associated with the user name in the SPA. When S178 is completed, the CPU 32 terminates the process of FIG. 6.

In S180, the CPU 32 executes various processes according to IPP. When S180 is completed, the CPU 32 terminates the process of FIG. 6.

(Specific Cases A to G; FIGS. 7 to 12)

Specific Cases A to G realized by the processes of FIGS. 3 to 6 will be described with reference to FIGS. 7 to 12.

Figure 7:
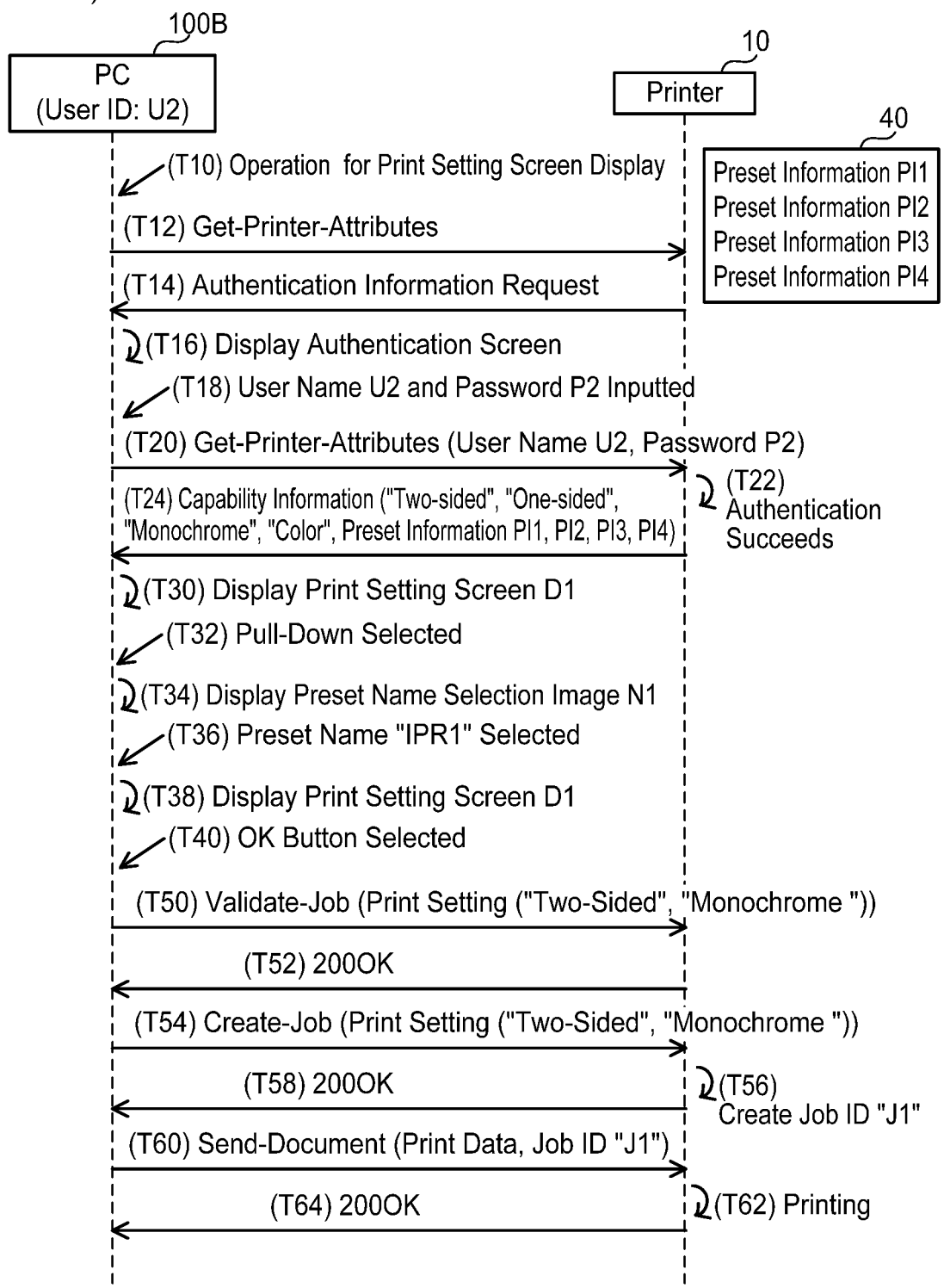
FIG. 7 shows a sequence diagram of Case A in which printing using preset information is executed.

(Case A; FIG. 7)

Case A will be described with reference to FIG. 7. In Case A, a print process using preset information in the preset table 40 is executed. In an initial state of Case A, four pieces of preset information PI1 to PI4 are stored in the preset table 40 of the printer 10. Further, passwords and pieces of authority information corresponding respectively to user names U1, U2, and U3 are stored in the user table 38 of the printer 10 (see FIG. 2). Further, in the user table 38, a registered preset name "DPR" is stored in association with the user name U1, registered preset names "DPR", "IPR1", "GPR1" are stored in association with the user name U2, and registered preset names "DPR", "IPR2", "GPR1" are stored in association with the user name U3 (see FIG. 2).

When accepting an operation for displaying a print setting screen in T10, the PC 100B sends a GPA to the printer 10 in T12.

When receiving the GPA from the PC 100B in T12 (NO in S10 and YES in S20 of FIG. 3, YES in S140 of FIG. 6), the printer 10 determines that a user name and a password are not included in the GPA (NO in S142), and sends an authentication information request to the PC 100B in T14 (S150).

When receiving the authentication information request from the printer 10 in T14, the PC 100B displays the authentication screen in T16. Then, when accepting an input of the user name U2 and a password P2 in T18, the PC 100B sends a GPA including the user name U2 and the password P2 to the printer 10 in T20.

When receiving the GPA from the PC 100B in T20 (NO in S10 and YES in S20 of FIG. 3, YES in S140 of FIG. 6), the printer 10 determines that a user name and a password are included in the GPA (YES in S142), and then in T22, it determines that the user authentication succeeds (YES in S144) because the combination of the user name U2 and the password P2 in the GPA is stored in the user table 38. Then, the printer 10 determines that an excluded preset name is not stored in the user table 38 in association with the user name U2 in the GPA, and thus identifies all the preset information PI1 to PI4 stored in the preset table 40 as sending-target preset information. Then, in T24, the printer 10 sends to the PC 100B capability information that includes all the print conditions which the printer 10 can use (i.e., "one-sided", "two-sided", "monochrome", and "color") and the preset information PI1 to PI4.

Figure 13:
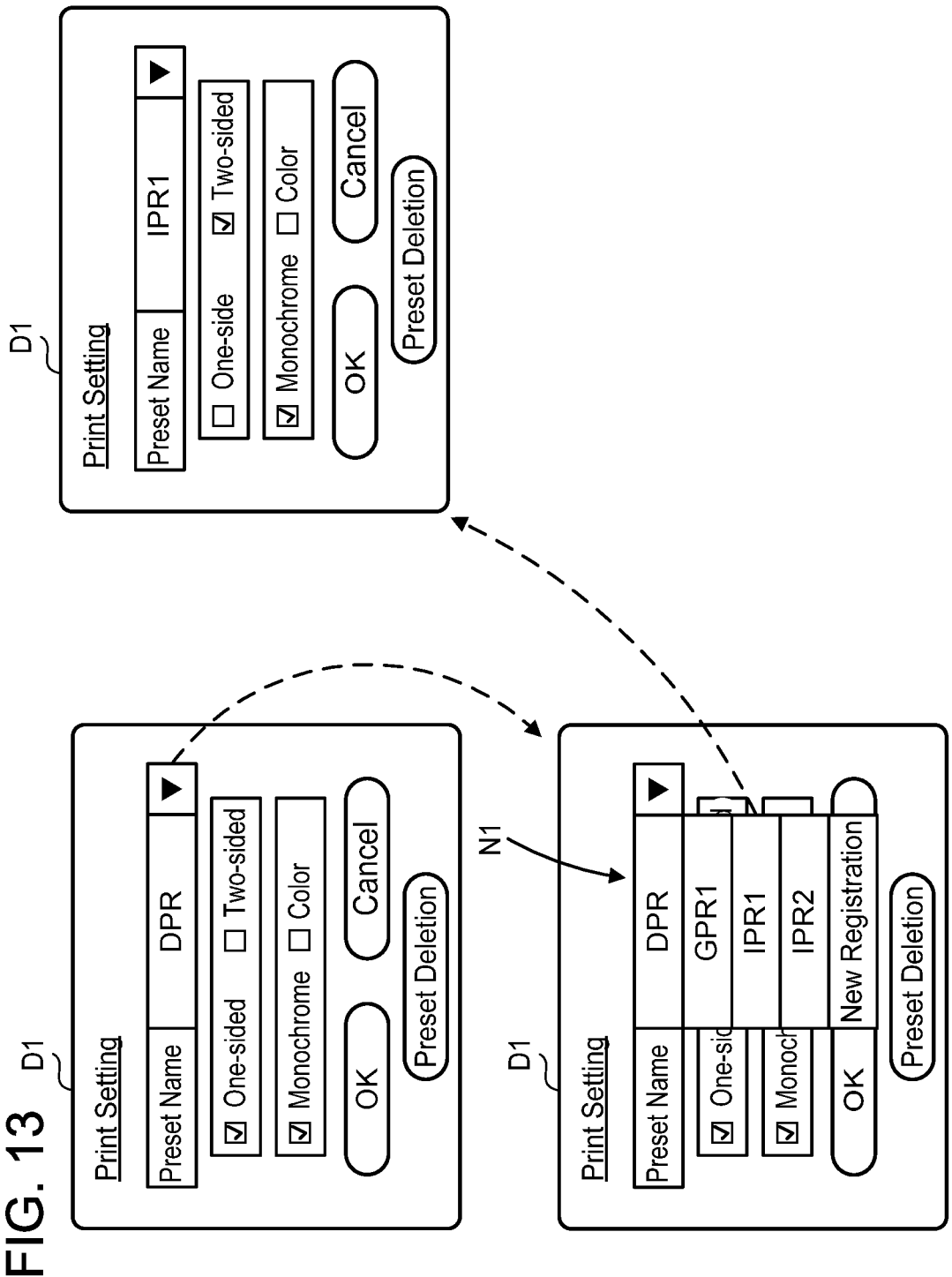
FIG. 13 shows examples of a screen displayed on a PC.

When receiving the capability information from the printer 10 in T24, the PC 100B displays a print setting screen D1 in T30. As shown in FIG. 13, the print setting screen D1 includes a preset name selection box for selection of a preset name, four checkboxes corresponding to the four print conditions (i.e., "one-sided", "two-sided", "monochrome", and "color"), an OK button, a cancel button, and a preset deletion button. In initial print setting screen D1, the preset name "DPR" is displayed in the preset name selection box and the checkboxes corresponding to "one-sided" and "monochrome" are checked. When accepting a selection of the pull-down of the preset selection box in T32, the PC 100B displays a preset name selection image N1 over the print setting screen D1 in T34. As shown in FIG. 13, the image N1 includes a list image of selectable preset names and a new registration image for registration of new preset information. When accepting a selection of the preset name "IPR1" in the preset name selection image N1 in T36, the PC 100B identifies the preset information PI3 in the capability information received in T24, which includes the preset name "IPR1". Then, the PC 100B identifies the print conditions "two-sided" and "monochrome" in the identified preset information PI3, and conforms the print setting on the print setting screen D1 to the identified print conditions in T38. Specifically, the PC 100B unchecks the checkbox corresponding to "one-sided" and checks the checkbox corresponding to "two-sided". As above, in response to a preset name in the preset name selection image N1 being selected by the user, the printer 10 can conform the print setting in the print setting screen D1 to the print setting information of the preset information including the selected preset name. Then, when accepting a selection of the OK button in T40, the PC 100B sends a VJ according to IPP to the printer 10 in T50. The VJ command includes the print setting (i.e., "two-sided", "monochrome").

When receiving the VJ from the PC 100B in T50, the printer 10 sends a 200OK to the PC 100B in T52 (S180). The 200OK is not a command defined by IPP but is a command defined by HTTP, and specifically, it is a command indicating that a process had been normally completed.

When receiving the 200OK from the printer 10 in T52, the PC 100B sends a Create-Job command (hereinbelow termed "CJ") according to IPP to the printer 10 in T54. The CJ includes the print setting (i.e., "two-sided", "monochrome").

When receiving the CJ from the PC 100B in T54, the printer 10 creates a unique job ID "J1" in T56 and sends a 200OK including the created job ID "J1" to the PC 100B in T58 (S180).

When receiving the 200OK from the printer 10 in T58, the PC 100B sends a Send-Document command (hereinbelow termed "SD") according to IPP to the printer 10 in T60. The SD includes print data and the job ID "J1" included in the received 200OK.

When receiving the SD from the PC 100B in T60, the printer 10 identifies the print setting (i.e., "two-sided", "monochrome") corresponding to the job ID "J1" in the SD, and then executes printing according to the print data in the SD and the identified print setting in T62 (S180). Then, the printer 10 sends a 200OK to the PC 100B in T64.

Figure 8:
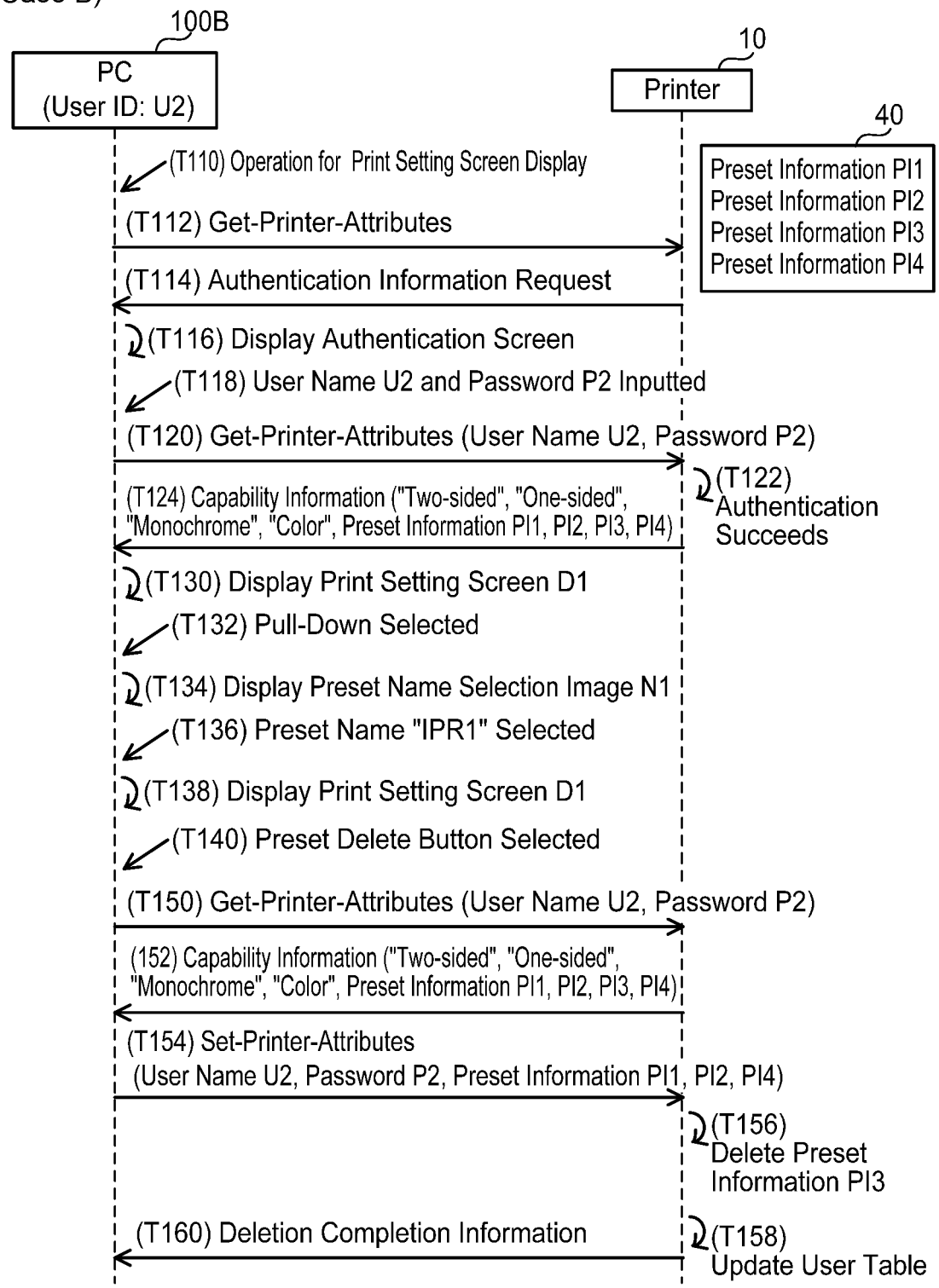
FIG. 8 shows a sequence diagram of Case B in which preset information is deleted.

(Case B; FIG. 8)

Case B will be described with reference to FIG. 8. In Case B, the individual preset information PI3 in the preset table 40 of the printer 10 is deleted by using communication according to IPP. An initial state of Case B is the same as the initial state of Case A.

T110 to T138 are the same as T10 to T38 of FIG. 7. When accepting a selection of the preset deletion button in T140, the PC 100B sends a GPA including the user name U2 and the password P2 to the printer 10 in T150. T152 is the same as T124. When receiving the capability information from the printer 10 in T152, the PC 100B identifies the preset information PI1 to PI4 in the capability information. Then, the PC 100B identifies the preset name "IPR1" that was displayed in the print setting screen D1 when the selection of the preset deletion button was accepted, and then identifies the preset information PI3 including the preset name "IPR1" as the deletion-target preset information from among the preset information PI1 to PI4 in the capability information. Then, the PC 100B excludes the preset information PI3 from the sending-target preset information, and sends an SPA including the user name U2, the password P2, and the preset information PI1, PI2, PI4 to the printer 10 in T154.

When receiving the SPA from the PC 100B in T154 (NO in S10 and YES in S20 of FIG. 3, NO in S140 and YES in S170 of FIG. 6), the printer 10 determines that the preset information PI3 is in the preset table 40 but is not in the SPA (YES in S172) and identifies the preset information PI3 as the deletion-target preset information. Then, the printer 10 determines that the preset information PI3 is not the default preset information (NO in S100 of FIG. 5) and determines that the authority information associated with the user name U2 included in the SPA is "Guest" in the user table 38 (NO in S102). Then, the printer 10 determines that the preset name "IPR1" of the preset information PI3 is stored in the user table 38 in association with the user name U2 included in the SPA (YES in S110), identifies that the preset name "IPR1" is stored in the user table 38 in association with only the user name U2, and determines that the preset information PI3 is the individual preset information (NO in S112). In this case, the printer 10 deletes the preset information PI3 from the preset table 40 in T156 (S104), deletes the preset name "IPR1" associated with the user name U2 from the user table 38 in T158 (S106), and sends the deletion completion information to the PC 100B in T160.

Figure 9:
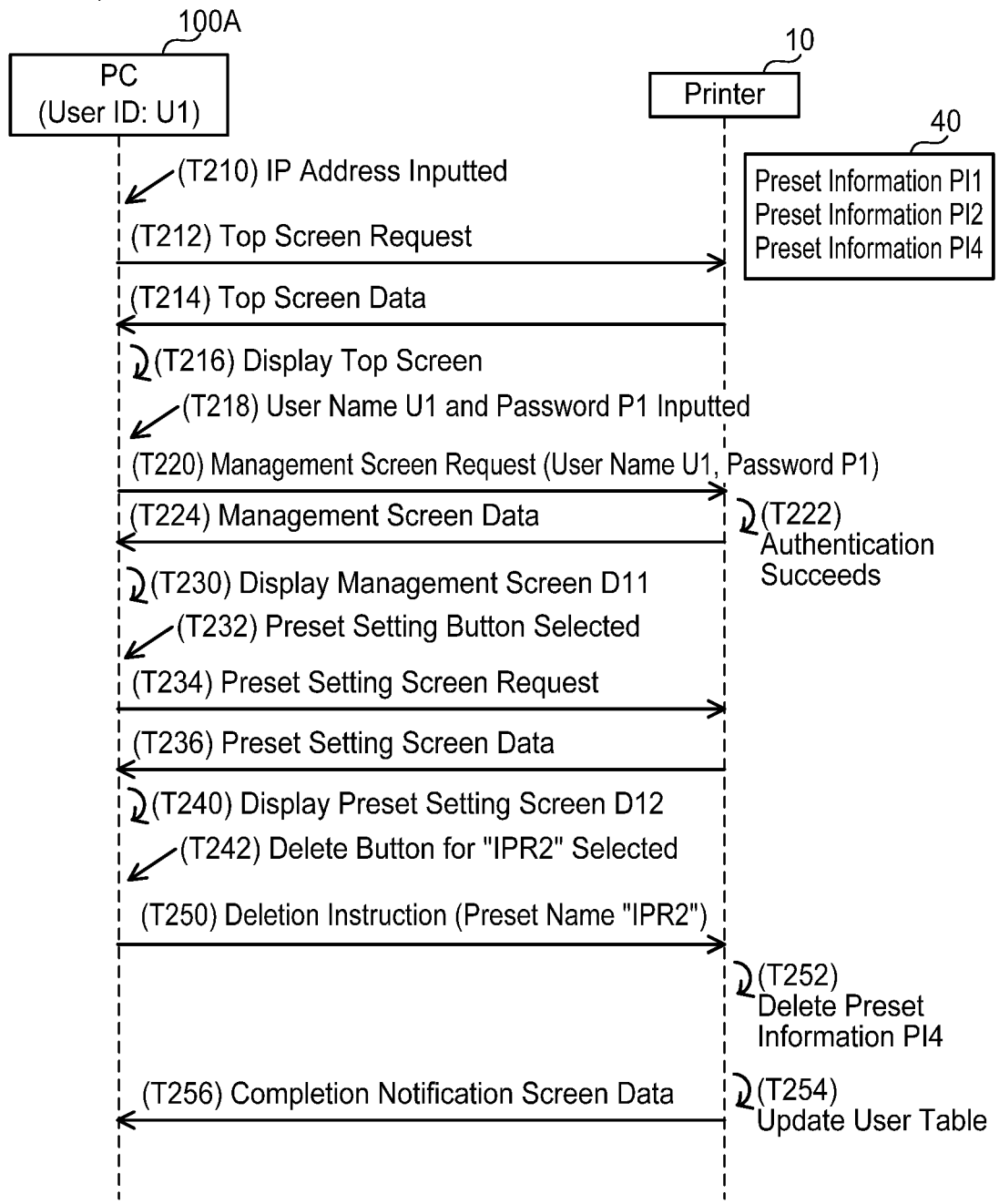
FIG. 9 shows a sequence diagram of Case C in which preset information is deleted.

(Case C; FIG. 9)

Case C will be described with reference to FIG. 9. In Case C, the individual preset information PI4 in the preset table 40 of the printer 10 is deleted by using the web server function of the printer 10. An initial state of Case C is the state after Case B, that is, three pieces of preset information PI1, PI2, PI4 are stored in the preset table 40.

When accepting an input of an IP address assigned to the printer 10 in T210, the PC 100A sends a top screen request to the printer 10 in T212.

When receiving the top screen request from the PC 100A in T212 (YES in S10 of FIG. 3), the printer 10 sends the top screen data to the PC 100A in T214 (S40 of FIG. 4).

When receiving the top screen data from the printer 10 in T214, the PC 100A displays the top screen in T216. When accepting an input of the user name U1 and a password P1 in T218, the PC 100A sends a management screen request including the user name U1 and the password P1 to the printer 10 in T220.

When receiving the management screen request from the PC 100A in T220 (S42), the printer 10 determines in T222 that the user authentication succeeds (YES in S44) because the combination of the user name U1 and the password P1 included in the management screen request is stored in the user table 38. Then, in T224, the printer 10 sends the management screen data to the PC 100A (S46).

When receiving the management screen data from the printer 10 in T224, the PC 100A displays the management screen D11 (see FIG. 14) in T230. Then, when accepting a selection of the preset setting button in T232, the PC 100A sends a preset setting screen request to the printer 10 in T234.

When receiving the preset setting screen request from the PC 100A in T234 (YES in S50), the printer 10 sends the preset setting screen data to the PC 100A in T236 (S52).

When receiving the preset setting screen data from the printer 10 in T236, the PC 100A displays the preset setting screen D12 (see FIG. 14) in T240. When accepting a selection of the deletion button corresponding to the preset name "IPR2" in T242, the PC 100A sends a deletion instruction including the preset name "IPR2" to the printer 10 in T250.

When receiving the deletion instruction from the PC 100A in T250 (YES in S70), the printer 10 determines that the preset information PI4 including the preset name "IPR2" in the deletion instruction is not the default preset information (NO in S100 of FIG. 5) and determines that the authority information associated with the authenticated user name U1 is "Owner" in the user table 38 (NO in S102). In this case, the printer 10 deletes the preset information PI4 from the preset table 40 in T252 (S104), deletes the registered preset name "IPR2" from the user table 38 in T254 (S106), and sends the completion notification screen data to the PC 100A in T256 (S108). As above, the administrator of the printer 10 can delete preset information that is not associated with the user name U1 of the administrator from the preset table 40. That is, the administrator of the printer 10 can delete such preset information from the preset table 40 regardless of whether the preset information is associated with the user name U1 of the administrator or not.

Figure 10:
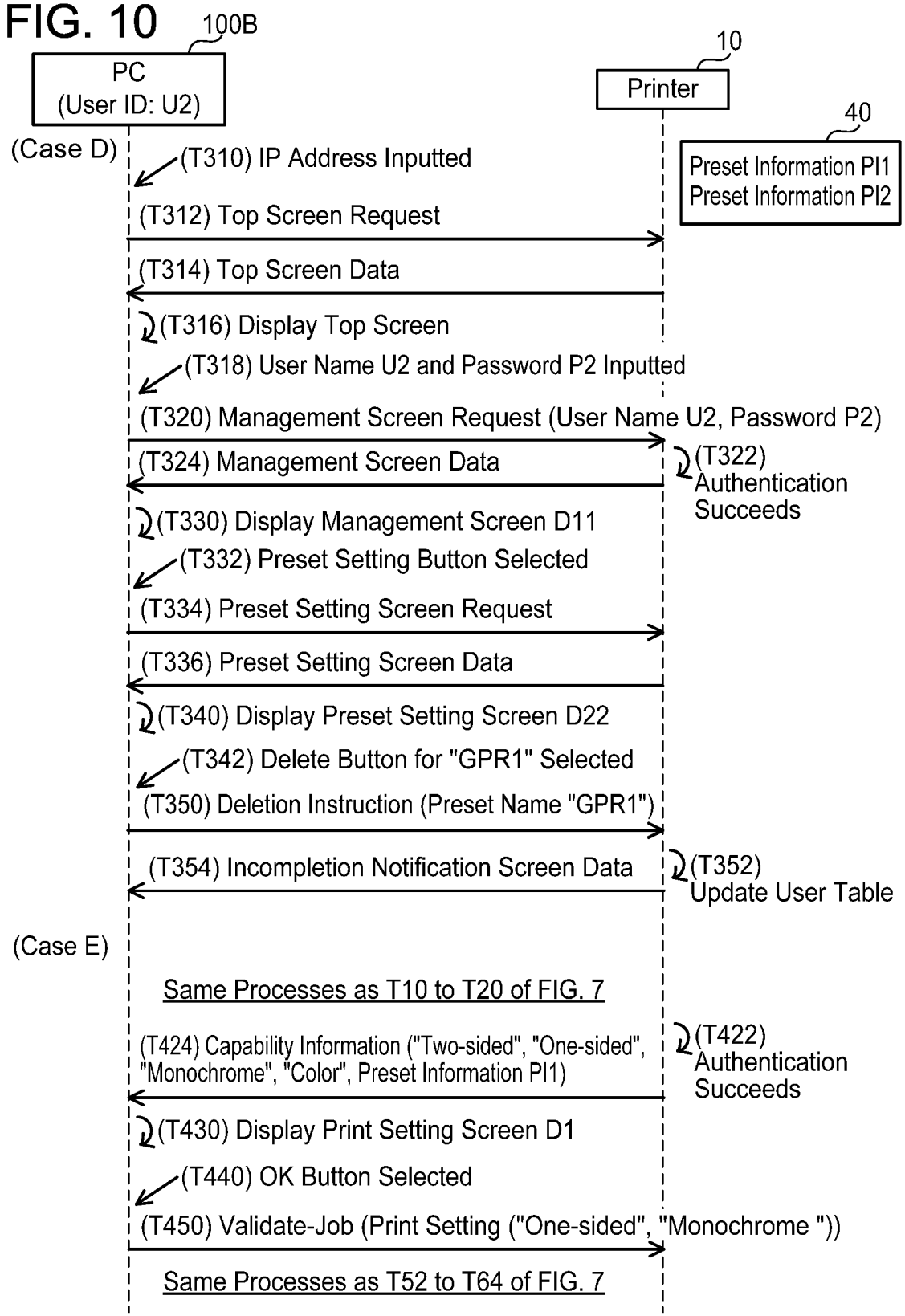
FIG. 10 shows a sequence diagram of Case D in which deletion of preset information is restricted and Case E in which printing using preset information is executed.

(Case D; FIG. 10)

Case D will be described with reference to FIG. 10. In Case D, deletion of the group preset information PI2 in the preset table 40 of the printer 10 is restricted. An initial state of Case D is the state after Case C, that is, the preset information PI1, PI2 are stored in the preset table 40 of the printer 10.

T310 to T336 are the same as T210 to T236 of FIG. 9 except that the communication counterpart is the PC 100B. In the present case, when accepting an input of the user name U2 and the password P2 in T318, the PC 100B sends a management screen request including the user name U2 and the password P2 to the printer 10 in T320.

The PC 100B displays the preset setting screen D22 (see FIG. 14) in T340. When accepting a selection of the deletion button corresponding to the preset name "GPR1" in T342, the PC 100B sends a deletion instruction including the preset name "GPR1" to the printer 10 in T350.

When receiving the deletion instruction from the PC 100B in T350 (YES in S70 of FIG. 4), the printer 10 identifies, in the preset table 40, the preset information PI2 including the preset name "GPR1" in the deletion instruction. Then, the printer 10 determines that the preset information PI2 is not the default preset information (NO in S100 of FIG. 5) and determines that the authority information associated with the authenticated user name U2 in the user table 38 is "Guest" (NO in S102). Then, the printer 10 determines that the preset name "GPR1" of the preset information PI2 is stored in the user table 38 in association with the authenticated user name U2 (YES in S110), identifies that the preset name "GPR1" is stored in the user table 38 in association with two user names U2, U3, and determines that the preset information PI2 is the group preset information (YES in S112). Then, the printer 10 determines that the preset name "GPR1" is not stored as an excluded preset name associated with the user name U3 in the user table 38 (NO in S114). In this case, the printer 10 does not delete the preset information PI2 from the preset table 40. In T352, the printer 10 deletes the preset name "GPR1" registered as a registered preset name associated with the user name U2 in the user table 38, registers the preset name "GPR1" as an excluded preset name associated with the user name U2 (S116), and sends the incompletion notification screen data to the PC 100B in T354 (S118).

(Effects of Case D)

As shown in Case B of FIG. 8, the printer 10 deletes the preset information PI3 from the preset table 40 when receiving the SPA that does not include the preset information PI3 from the PC 100B (T154) in a situation where the preset name "IPR1" of the preset information PI3 is stored in association with only the user name U2 in the user table 38. On the other hand, as shown in Case D of FIG. 10, the printer 10 does not delete the preset information PI2 from the preset table 40 when receiving the deletion instruction including the preset name "GPR1" of the preset information PI2 from the PC 100B (T350) in a situation where the preset name "GPR1" of the preset information PI2 is stored in the user table 38 in association with two user names U2, U3. The preset information PI3 is used solely by the user who uses the PC 100B, whereas the preset information PI2 is used by both the user who uses the PC 100B and the user who uses the PC 100C. If the preset information PI2 is deleted from the preset table 40 in response to the receipt of the deletion instruction including the preset name "GPR1" of the preset information PI2 from the PC 100B, the user who uses the PC 100C can no longer execute printing by using the preset information PI2. The above configuration can prevent the preset information PI2 from being deleted from the preset table 40 in a situation where there is a user who wishes to use the preset information PI2.

(Case E; FIG. 10)

Case E will be described with reference to FIG. 10. In Case E, a print process according to IPP is executed in a state where the excluded preset name "GPR1" is stored in association with the user name U2 in the user table 38 of the printer 10. An initial state of Case E is the state after Case D, that is, the preset name "GPR1" is stored as an excluded preset name associated with the user name U2 in the user table 38.

Firstly, processes same as T10 to T20 of FIG. 7 are executed between the PC 100B and the printer 10. When the user authentication succeeds in T422, the printer 10 determines that the excluded preset name "GPR1" is stored in the user table 38 in association with the user name U2 in the GPA and identifies the preset information PI1, which is other than the preset information PI2 including the excluded preset name "GPR1", as the sending-target preset information from among the preset information PI1, PI2 stored in the preset table 40. Then, in T424, the printer 10 sends to the PC 100B capability information that includes all the print conditions which the printer 10 can execute (i.e., "one-sided", "two-sided", "monochrome", "color") and the preset information PI1. T430 and T440 are respectively the same as T30 and T40. In T450, the PC 100B sends a VJ including the print setting (i.e., "two-sided", "monochrome") to the printer 10. After this, processes same as T52 to T64 are executed between the PC 100B and the printer 10.

(Effects of Case E)

As shown in Case E of FIG. 10, when the excluded preset name "GPR1" is stored in the user table 38 in association with the user name U2, the printer 10 sends the capability information that does not include the preset information PI2 including the preset name "GPR1" to the PC 100B (T424). The preset information PI2 including the excluded preset name "GPR1" is information that the user having the user name U2 had requested deletion for. That is, the user having the user name U2 does not wish to use the preset information PI2. As such, sending of undesired information to the PC 100B can be prevented.

Figure 11:
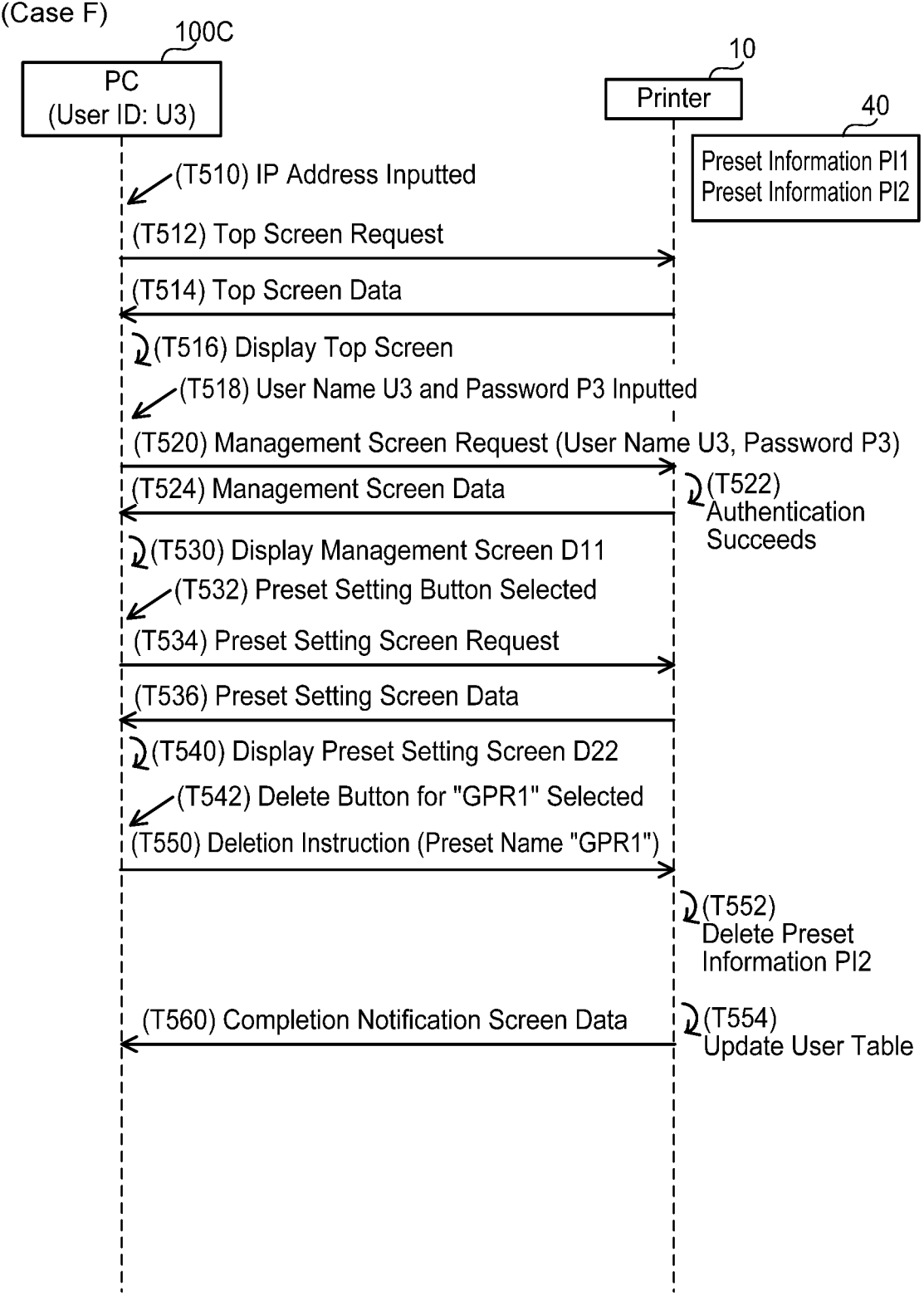
FIG. 11 shows a sequence diagram of Case F in which preset information is deleted.

(Case F; FIG. 11)

Case F will be described with reference to FIG. 11. In Case F, the group preset information PI2 in the user table 38 of the printer 10 is deleted. An initial state of Case F is the same as the initial state of Case E. T510 to T550 are the same as T310 to T350 of FIG. 10 except that the communication counterpart is the PC 100C and the user name and the password are different.

When receiving the deletion instruction from the PC 100C in T550 (Yes in S70 of FIG. 4), the printer 10 identifies, in the preset table 40, the preset information PI2 including the preset name "GPR1" in the deletion instruction. Then, the printer 10 determines that the preset information PI2 is not the default preset information (NO in S100 of FIG. 5) and determines that the authority information associated with the authenticated user name U3 in the user table 38 is "Guest" (NO in S102). Then, the printer 10 determines that the preset name "GPR1" of the preset information PI2 is stored in the user table 38 in association with the authenticated user name U3 (YES in S110), identifies that the preset name "GPR1" is stored in the user table 38 in association with two user names U2, U3, and determines that the preset information PI2 is the group preset information (YES in S112). The printer 10 then determines that the preset name "GPR1" is stored in the user table 38 as an excluded preset name associated with the user name U2 (YES in S114). In this case, the printer 10 deletes the preset information PI2 from the preset table 40 in T552 (S104), deletes the preset name "GPR1" stored as an registered preset name associated with the user name U3 from the user table 38 and deletes the preset name "GPR1" stored as an excluded preset name associated with the user name U2 in T554 (S106), and sends the completion notification screen data to the PC 100B in T560 (S108).

(Effects of Case F)

As shown in Case D of FIG. 10, the printer 10 does not delete the preset information PI2 from the preset table 40 (T356) even though receiving the user name U2 and the deletion instruction from the PC 100B (T320, T350 of FIG. 10) in a situation where the preset name "GPR1" of the preset information PI2 is stored in the user table 38 in association with the two user names U2, U3. On the other hand, as shown in Case D of FIG. 10 and Case F of FIG. 11, the printer 10 deletes the preset information PI2 from the preset table 40 (T552) in a case of receiving the user name U2 and the deletion instruction from the PC 100B (T320, T350 of FIG. 10) as well as receiving the user name U3 and the deletion instruction from the PC 100C (T520, T550 of FIG. 11) in the situation where the preset name "GPR1" of the preset information PI2 is stored in the user table 38 in association with the two user names U2, U3. The above configuration enables appropriate deletion of the preset information PI2 of which use is desired by two or more users.

Figure 12:
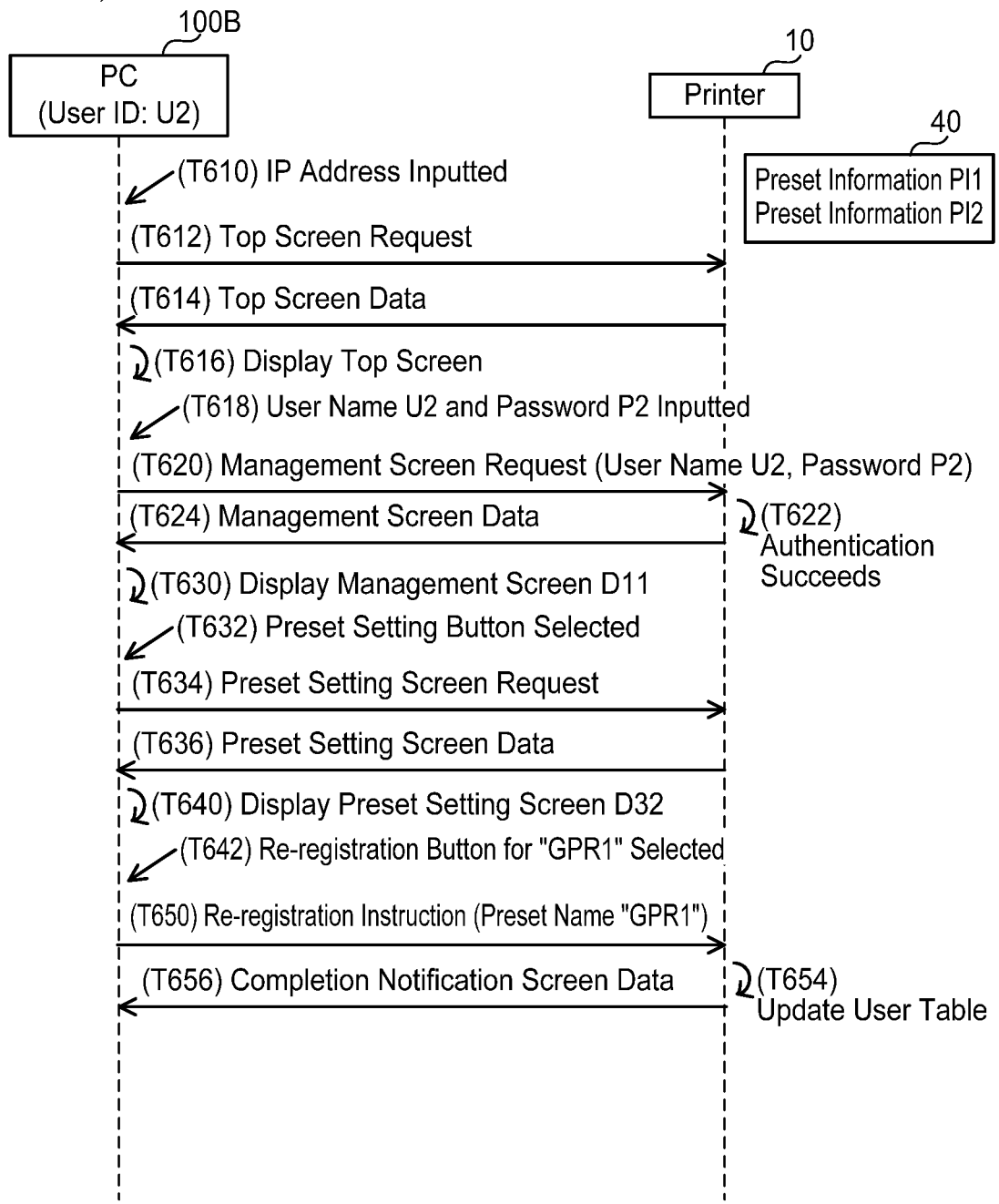
FIG. 12 shows a sequence diagram of Case G in which preset information is re-registered.

(Case G; FIG. 12)

Case G will be described with reference to FIG. 12. In Case G, the preset name "GPR1" included in a registration instruction is registered in the user table 38 as a registered preset name instead of as an excluded preset name for the information associated with the authenticated user name U2 in the user table 38. An initial state of Case G is the same as the initial state of Case E. T610 to T634 are the same as T310 to T334 of FIG. 10. When receiving the preset setting screen request from the PC 100B in T634, the printer 10 determines that the excluded preset name "GPR1" is stored in the user table 38 in association with the authenticated user name U2. In this case, the printer 10 sends to the PC 100B preset screen data for displaying the preset setting screen D32 in which the re-registration button corresponds to the preset name "GPR1" in T636.

When receiving the preset setting screen data from the printer 10 in T636, the PC 100B displays the preset setting screen D32 (see FIG. 14) in T640. When accepting a selection of the re-registration button corresponding to the preset name "GPR1" in T642, the PC 100B sends a re-registration instruction including the preset name "GPR1" to the printer 10 in T650.

When receiving the re-registration instruction from the PC 100B in T650 (YES in S80), the printer 10 registers the preset name "GPR1" included in the registration instruction as a registered preset name instead of as an excluded preset name for the information associated with the authenticated user name U2 in the user table 38 in T654 (S82), and sends the completion notification screen data to the PC 100B in T656 (S84).

(Effects of Case G)

As shown in Case G of FIG. 12, when receiving the re-registration instruction from the PC 100B (T650), the printer 10 registers the preset name "GPR1" included in the registration instruction as a registered preset name instead of as an excluded preset name for the information associated with the authenticated user name U2 in the user table 38 (T654). In such a configuration, the user who uses the PC 100B does not have to perform an operation for newly registering the preset information PI2 when the user wishes to use the preset information PI2. Thus, user convenience can be improved.

(Effects of Present Embodiment)

The printer 10 receives a user name and a deletion instruction (or an SPA) from one of the PCs 100 (S42, S70 of FIG. 4, S170 of FIG. 6). In a case where the user name is stored in association with preset information in the memory 34, the printer 10 deletes the preset information from the memory 34 (S104 of FIG. 5), while it does not delete the preset information in a case where the user name is not stored in association with the preset information in the memory 34. As such, the printer 10 can suitably delete preset information according to a request from a user that is different from the administrator.

(Corresponding Relationships)

The PC 100B is an example of "first external device". The user names U2 and U3 are examples of "user identification information". The preset information PI1 to PI4 are examples of "print setting information". The SPA and the deletion instruction are examples of "deletion request". The preset name in the SPA and the preset name in the deletion instruction are examples of "specific information". The user name U2 is an example of "first user identification information". The preset information PI2 and PI3 are examples of "first print setting information". The SPA in T154 of FIG. 8 and the deletion instruction in T350 of FIG. 10 are examples of "first deletion request". The information included in the SPA in T154 of FIG. 8 and the information included in the deletion instruction in T350 of FIG. 10 are examples of "first specific information". The GPA is an example of "capability information request". T140 of FIG. 8 is an example of "first predetermined operation". The top screen data request is an example of "access request". The top screen and the top screen data are respectively examples of "acceptance screen" and "acceptance screen data". T342 of FIG. 10 is an example of "second predetermined operation".

The user name U3 is an example of "second user identification information". The PC 100C is an example of "second external device". The deletion instruction in T550 of FIG. 11 is an example of "second deletion request". The information included in the deletion instruction in T550 of FIG. 11 is an example of "second specific information". The excluded preset name in the user table 38 in the memory 34 of the printer 10 is an example of "received information".

The re-registration instruction is an example of "third deletion request". The preset information PI1 is an example of "default print setting information". The user name U1 is an example of "administrator identification information". The PC 100A is an example of "third external device". The deletion instruction in T250 of FIG. 9 is an example of "fourth deletion request". The preset information PI4 is an example of "second print setting information".

S42 of FIG. 4 and S170 of FIG. 6 are examples of "receive first user identification information". S70 of FIG. 4 and S170 of FIG. 6 are examples of "receive a first deletion request". S104 of FIG. 5 is an example of "delete the first print setting information".

(First Variant) In a case of receiving a command including only the deletion-target preset information (i.e., deletion command) instead of the SPA, the printer 10 may delete the preset information included in the command from the preset table 40. Further, the SPA may include only the deletion-target preset information.

(Second Variant) After T140 of FIG. 8, the PC 100B may extract the preset information PI1 to PI4 in the capability information received in T124 and send to the printer 10 in T154 an SPA that includes the user name U2, the password P2, and the preset information PH, PI2, PI4. In this variant, T150 and T152 may be omitted.

(Third Variant) S174 of FIG. 6 may be omitted. In this variant, "receive first capability information request" and "send the capability information and the first print setting information" may be omitted.

(Fourth Variant) S70 and S72 of FIG. 4 may be omitted. In this variant, "receive an access request" and "send acceptance screen data" may be omitted.

(Fifth Variant) S112 to S118 of FIG. 5 may be omitted. In this variant, the CPU 32 proceeds to S104 in the case of determining YES in S110 of FIG. 5. In this variant, "receive the second user identification information", "receive a second deletion request", "store received information", "receive second capability information request", "send the capability information and the first print setting information", "receive the first user identification information and a third deletion request", and "delete the received information" may be omitted.

(Sixth Variant) In S66 of FIG. 4, the CPU 32 may cause the memory 34 to store the authenticated user name as a registered user name corresponding to the preset information included in the registration instruction. Further, the CPU 32 may cause the memory 34 to store the user name in the SPA as a registered user name corresponding to the registration-target preset information in the SPA in S176. In this variant, the CPU 32 may determine whether or not the authenticated user name is stored as a registered user name associated with the deletion-target preset information in S110 of FIG. 5. In a case where the authenticated user name is stored as a registered user name associated with the deletion-target preset information, the CPU 32 determines that the user having the authenticated user name is a deletion-permitted user, while it determines that the user having the authenticated user name is not a deletion-permitted user in a case where the authenticated user name is not stored as a registered user name associated with the deletion-target preset information. In this variant, S112 to S118 of FIG. 5 may be omitted. According to this variant, the user who registered the deletion-target preset information can delete this preset information regardless of whether the deletion-target preset information is the group preset information or not. Thus, the preset information can suitably be deleted.

(Seventh Variant) After deleting a preset name stored as an excluded preset name from the user table 38, the printer 10 may not be able to register that preset name as a registered preset name. In this variant, "receive the first user identification information and a third deletion request", "delete the receipt information" may be omitted.

(Eighth Variant) The printer 10 may send all the preset information stored in the preset table 40 even when preset name(s) of one or more of the preset information is stored as an excluded preset name in the user table 38.

(Ninth Variant) Each of the PCs 100A to 100C may send the management screen request when accepting an input of the IP address assigned to the printer 10. In this variant, the printer 10 sends authentication screen data to the PC when receiving the preset setting screen request. In another variant, the management screen or the preset setting screen may include an image for inputting a user name and a password. In yet another variant, a screen for inputting a user name and a password may be displayed when the deletion button corresponding to a preset name is selected.

(Tenth Variant) In the above embodiment, the processes executed by the controller 30 are realized by software (i.e., the program 36), however, at least one of these processes may be realized by hardware such as a logic circuit.

What is claimed is:

1. A printer comprising:
   a memory configured to store, for each of one or more user identification information for identifying one or more users different from an administrator of the printer, the user identification information and print setting information in association with each other;
   a communication interface; and
   a controller configured to:
   receive a first capability information request including first user identification information among the one or more user identification information from a first external device via the communication interface, the first capability information request being for requesting sending of capability information indicating a capability of a printer;
   in a case where the first capability information request is received from the first external device, send the capability information and first print setting information to the first external device via the communication interface;
   in a case where a predetermined operation is performed on the first external device after the capability information and the first print setting information have been sent to the first external device, receive a first deletion request including first specific information and the first user identification information from the first external device via the communication interface, the first deletion request being for requesting deletion of one of the one or more print setting information in the memory, the first specific information being for identifying first print setting information among the one or more print setting information in the memory; and
   in a case where the first deletion request is received from the first external device and the first user identification information is stored in the memory in association with the first print setting information, delete the first print setting information identified by the first specific information from the memory.

2. The printer as in claim 1, wherein
   in a case where the first user identification information and the first deletion request are received from the first external device in a first situation where the first print setting information is stored in the memory in association only with the first user identification information, the first print setting information is deleted from the memory, and
   in a case where the first user identification information and the first deletion request are received from the first external device in a second situation where the first print setting information is stored in the memory in association with each of the first user identification information and second user identification information, the first print setting information is not deleted from the memory.

3. The printer as in claim 2, wherein the controller is further configured to:
   receive the second user identification information from a second external device via the communication interface; and
   receive a second deletion request including second specific information from the second external device via the communication interface, the second deletion request being for requesting deletion of one of the one or more print setting information in the memory, the second specific information being for identifying the first print setting information among the one or more print setting information in the memory,
   wherein in a case where the first user identification information and the first deletion request are received from the first external device and the second user identification information and the second deletion request are received from the second external device under the second situation, the first print setting information identified by the first specific information and the second specific information is deleted from the memory, and
   wherein in a case where the first user identification information and the first deletion request are received from the first external device and the second user identification information and the second deletion request are not received from the second external device under the second situation, the first print setting information is not deleted from the memory.

4. The printer as in claim 3, wherein the controller is further configured to:
   in the case where the first user identification information and the first deletion request are received from the first external device and the second user identification information and the second deletion request are not received from the second external device under the second situation, store received information in the memory in association with the first user identification information and the first print setting information, the received information indicating that the first deletion request has been received;
   receive a second capability information request including the first user identification information from the first external device via the communication interface, the second capability information request being for requesting sending of capability information indicating a capability of the printer;
   in a case where the second capability information request is received from the first external device and the received information is not stored in the memory in association with the first user identification information and the first print setting information, send the capability information and the first print setting information to the first external device via the communication interface; and in a case where the second capability information request is received from the first external device and the received information is stored in the memory in association with the first user identification information and the first print setting information, send the capability information to the first external device via the communication interface without sending the first print setting information to the first external device.

5. The printer as in claim 4, wherein the controller is further configured to:
receive the first user identification information and a third deletion request including third specific information from the first external device via the communication interface, the third deletion request being for requesting deletion of the received information in the memory, the third specific information being for identifying the first print setting information; and
in a case where the first user identification information and the third deletion request are received from the first external device, delete the received information associated with the first user identification information and the first print setting information identified by the third specific information from the memory.

6. The printer as in claim 1, wherein
the memory is further configured to store default print setting information in advance, and
in a case where the first user identification information and the first deletion request are received from the first external device and the first print setting information is the default print setting information, the default print setting information in the memory in association with the first user identification information is not deleted from the memory.

7. The printer as in claim 1, wherein
the memory is further configured to store administrator identification information for identifying the administrator of the printer,
wherein the controller is further configured to:
receive the administrator identification information from a second external device via the communication interface;
receive a second deletion request including second specific information from the second external device via the communication interface, the second deletion request being for requesting deletion of one of the one or more print setting information in the memory, the second specific information being for identifying second print setting information among the one or more print setting information in the memory; and
in a case where the administrator identification information and the second deletion request are received from the second external device, delete the second print setting information identified by the second specific information from the memory regardless of whether or not the second print setting information is stored in the memory in association with the administrator identification information.

8. A non-transitory computer-readable recording medium storing computer-readable instructions for a printer,
the printer comprising:
a processor;
a memory storing, for each of one or more user identification information for identifying one or more users different from an administrator of the printer, the user identification information and print setting information in association with each other; and
a communication interface,
wherein the computer-readable instructions, when executed by the processor, cause the printer to:
receive a first capability information request including first user identification information among the one or more user identification information from a first external device via the communication interface, the first capability information request being for requesting sending of capability information indicating a capability of a printer;
in a case where the first capability information request is received from the first external device, send the capability information and first print setting information to the first external device via the communication interface;
in a case where a first predetermined operation is performed on the first external device after the capability information and the first print setting information have been sent to the first external device, receive a first deletion request including first specific information and the first user identification information from the first external device via the communication interface, the first deletion request being for requesting deletion of one of the one or more print setting information in the memory, the first specific information being for identifying first print setting information among the one or more print setting information in the memory; and
in a case where the first deletion request is received from the first external device and the first user identification information is stored in the memory in association with the first print setting information, delete the first print setting information identified by the first specific information from the memory.

9. A printer comprising:
a memory configured to store, for each of one or more user identification information for identifying one or more users different from an administrator of the printer, the user identification information and print setting information in association with each other;
a communication interface; and
a controller configured to:
receive an access request for requesting an access to a web server in a printer from a first external device via the communication interface;
in a case where the access request is received from the first external device, send acceptance screen data via the communication interface, the acceptance screen data representing an acceptance screen for accepting an input of user identification information;
in a case where first user identification information among the one or more user identification information is inputted to the acceptance screen after the acceptance screen data has been sent to the first external device, receive the first user identification information from the first external device via the communication interface;
in a case where a predetermined operation is performed on the first external device, receive a first deletion request including first specific information from the first external device via the communication interface, the first deletion request being for requesting deletion of one of the one or more print setting information in the memory, the first specific information being for identifying first print setting information among the one or more print setting information in the memory; and
in a case where the first user identification information and the first deletion request are received from the first external device in a first situation where the first print setting information is stored in the memory in association only with the first user identification information, delete the first print setting information identified by the first specific information from the memory, wherein in a case where the first user identification information and the first deletion request are received from the first external device in a second situation where the first print setting information is stored in the memory in association with each of the first user identification information and second user identification information, the first print setting information is not deleted from the memory.

10. The printer as in claim 9, wherein the controller is further configured to:
receive the second user identification information from a second external device via the communication interface; and
receive a second deletion request including second specific information from the second external device via the communication interface, the second deletion request being for requesting deletion of one of the one or more print setting information in the memory, the second specific information being for identifying the first print setting information among the one or more print setting information in the memory,
wherein in a case where the first user identification information and the first deletion request are received from the first external device and the second user identification information and the second deletion request are received from the second external device under the second situation, the first print setting information identified by the first specific information and the second specific information is deleted from the memory, and
wherein in a case where the first user identification information and the first deletion request are received from the first external device and the second user identification information and the second deletion request are not received from the second external device under the second situation, the first print setting information is not deleted from the memory.

11. The printer as in claim 10, wherein the controller is further configured to:
in the case where the first user identification information and the first deletion request are received from the first external device and the second user identification information and the second deletion request are not received from the second external device under the second situation, store received information in the memory in association with the first user identification information and the first print setting information, the received information indicating that the first deletion request has been received;
receive a capability information request including the first user identification information from the first external device via the communication interface, the capability information request being for requesting sending of capability information indicating a capability of the printer;
in a case where the capability information request is received from the first external device and the received information is not stored in the memory in association with the first user identification information and the first print setting information, send the capability information and the first print setting information to the first external device via the communication interface; and
in a case where the capability information request is received from the first external device and the received information is stored in the memory in association with the first user identification information and the first print setting information, send the capability information to the first external device via the communication interface without sending the first print setting information to the first external device.

12. The printer as in claim 11, wherein the controller is further configured to:
receive the first user identification information and a third deletion request including third specific information from the first external device via the communication interface, the third deletion request being for requesting deletion of the received information in the memory, the third specific information being for identifying the first print setting information; and
in a case where the first user identification information and the third deletion request are received from the first external device, delete the received information associated with the first user identification information and the first print setting information identified by the third specific information from the memory.

13. The printer as in claim 9, wherein
the memory is further configured to store default print setting information in advance, and
in a case where the first user identification information and the first deletion request are received from the first external device and the first print setting information is the default print setting information, the default print setting information in the memory in association with the first user identification information is not deleted from the memory.

14. The printer as in claim 9, wherein
the memory is further configured to store administrator identification information for identifying the administrator of the printer,
wherein the controller is further configured to:
receive the administrator identification information from a third external device via the communication interface;
receive a fourth deletion request including fourth specific information from the third external device via the communication interface, the fourth deletion request being for requesting deletion of one of the one or more print setting information in the memory, the fourth specific information being for identifying second print setting information among the one or more print setting information in the memory; and
in a case where the administrator identification information and the fourth deletion request are received from the third external device, delete the second print setting information identified by the fourth specific information from the memory regardless of whether or not the second print setting information is stored in the memory in association with the administrator identification information.

* * * * *